US012025342B2

(12) United States Patent
Fukushima et al.

(10) Patent No.: US 12,025,342 B2
(45) Date of Patent: Jul. 2, 2024

(54) VENTILATION DEVICE

(71) Applicant: DAIKIN INDUSTRIES, LTD., Osaka (JP)

(72) Inventors: Wataru Fukushima, Osaka (JP); Shinya Murai, Osaka (JP); Ryota Suhara, Osaka (JP); Kanako Bando, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 18/325,993

(22) Filed: May 30, 2023

(65) Prior Publication Data

US 2023/0304682 A1  Sep. 28, 2023

Related U.S. Application Data

(63) Continuation of application No. PCT/JP2021/042988, filed on Nov. 24, 2021.

(30) Foreign Application Priority Data

Nov. 30, 2020 (JP) .................................. 2020-198228

(51) Int. Cl.
*F24F 7/013* (2006.01)
*F24F 1/0323* (2019.01)
(Continued)

(52) U.S. Cl.
CPC ............ *F24F 7/013* (2013.01); *F24F 1/0323* (2019.02); *F24F 7/06* (2013.01); *F24F 13/222* (2013.01); *F24F 2221/52* (2013.01)

(58) Field of Classification Search
CPC .. F24F 1/0323; F24F 7/013; F24F 7/06; F24F 13/222; F24F 2221/52
(Continued)

(56) References Cited

U.S. PATENT DOCUMENTS 3,722,838 A * 3/1973 Swimmer ................. F24F 6/04
                                                        261/100
3,908,752 A   9/1975 Padden
(Continued)

FOREIGN PATENT DOCUMENTS

CN    211233247 U    8/2020
EP    2053317 A1    4/2009
(Continued)

OTHER PUBLICATIONS

International Search Report issued in corresponding International Application No. PCT/JP2021/042988, dated Feb. 8, 2022 (7 pages).
(Continued)

*Primary Examiner* — Allen R. B. Schult
(74) *Attorney, Agent, or Firm* — Osha Bergman Watanabe & Burton LLP (57) ABSTRACT

A ventilation device to be installed outdoors, includes: an air supply fan; an exhaust fan; a heat exchanger; and a casing having an accommodation space that accommodates the air supply fan, the exhaust fan, and the heat exchanger. The casing includes: a partition defining a lower end of the accommodation space and including a first outside air intake port and a first exhaust port each passing through the partition in an up-and-down direction; a bottom plate; an outside air intake chamber defined between the bottom plate and the partition disposed above the bottom plate and that communicates with the first outside air intake port; an exhaust chamber defined between the bottom plate and the partition and that communicates with the first exhaust port; and side plates.

18 Claims, 8 Drawing Sheets

(51) Int. Cl.
*F24F 7/06* (2006.01)
*F24F 13/22* (2006.01)

(58) Field of Classification Search
USPC .......................................................... 454/234
See application file for complete search history.

(56) References Cited

U.S. PATENT DOCUMENTS

| | | | | |
|---|---|---|---|---|
| 3,958,628 | A | * | 5/1976 | Padden .................... F24F 11/81 165/64 |
| 8,939,826 | B2 | | 1/2015 | Zorzit et al. |
| 2010/0287953 | A1 | * | 11/2010 | Urch ..................... F28D 9/0025 165/59 |

FOREIGN PATENT DOCUMENTS

| | | |
|---|---|---|
| JP | S56-074233 U | 6/1981 |
| JP | H02-061446 A | 3/1990 |
| JP | 2005-043032 A | 2/2005 |
| JP | 2014-020768 A | 2/2014 |
| JP | 2015-129621 A | 7/2015 |
| KR | 102081237 B1 | 2/2020 |

OTHER PUBLICATIONS

Written Opinion issued in corresponding International Application No. PCT/JP2021/042988, dated Feb. 8, 2022 (4 pages).
Notice of Reasons for Refusal issued in corresponding Japanese Patent Application No. JP 2020-198228, dated Feb. 8, 2022 (7 pages).
Decision to Grant a Patent issued in corresponding Japanese Patent Application No. JP 2020-198228, dated Aug. 23, 2022 (5 pages).
English translation of International Preliminary Report on Patentability issued in corresponding International Application No. PCT/JP2021/042988 dated Jun. 15, 2023 (6 pages).
Extended European Search Report issued in corresponding European Application No. 21897973 dated Feb. 26, 2024 (9 pages).

* cited by examiner

VENTILATION DEVICE

TECHNICAL FIELD

The present disclosure relates to a ventilation device.

BACKGROUND

Patent Literature 1 discloses a ventilation device to be installed outdoors. This ventilation device includes an exhaust fan, an air supply fan, a heat exchanger, and a casing accommodating these components. The casing has a lower stage portion where the exhaust fan is placed, an upper stage portion where the air supply fan is placed, and a middle stage portion where the heat exchanger is placed. The casing has an exhaust air port bored in its front surface and located at the lower stage portion, a return air opening and a supply air opening each bored in its rear surface and located at the upper stage portion, and outside air ports respectively bored in its left and right side surfaces and located at the middle stage portion.

According to the ventilation device disclosed in Patent Literature 1, when the air supply fan operates, outdoor air flows into the casing through the outside air port, and then flows through the heat exchanger. The air is then guided indoors through the supply air opening. When the exhaust fan operates, indoor air flows into the casing through the return air opening, and then flows through the heat exchanger. The air is then discharged outdoors through the exhaust air port.

PATENT LITERATURE

PATENT LITERATURE 1: Japanese Laid-Open Patent Publication No. 2014-20768

SUMMARY

The present disclosure provides a ventilation device to be installed outdoors, the ventilation device including:
an air supply fan;
an exhaust fan; and
a casing having an accommodation space in which the air supply fan and the exhaust fan are accommodated,
wherein
the casing includes a partition defining a lower end of the accommodation space,
the partition has a first outside air intake port and a first exhaust port each passing through the partition in an up-and-down direction,
the casing includes a bottom plate and has an outside air intake chamber defined between the bottom plate and the partition located above the bottom plate, the outside air intake chamber communicating with the first outside air intake port, and an exhaust chamber defined between the bottom plate and the partition located above the bottom plate, the exhaust chamber communicating with the first exhaust port, and
the casing includes side plates respectively having a second outside air intake port through which the outside air intake chamber communicates with an outside of the casing and a second exhaust port through which the exhaust chamber communicates with the outside of the casing.

DETAILED DESCRIPTION

Hereinafter, embodiments of the present disclosure will be described in detail with reference to the accompanying drawings.

Figure 1:
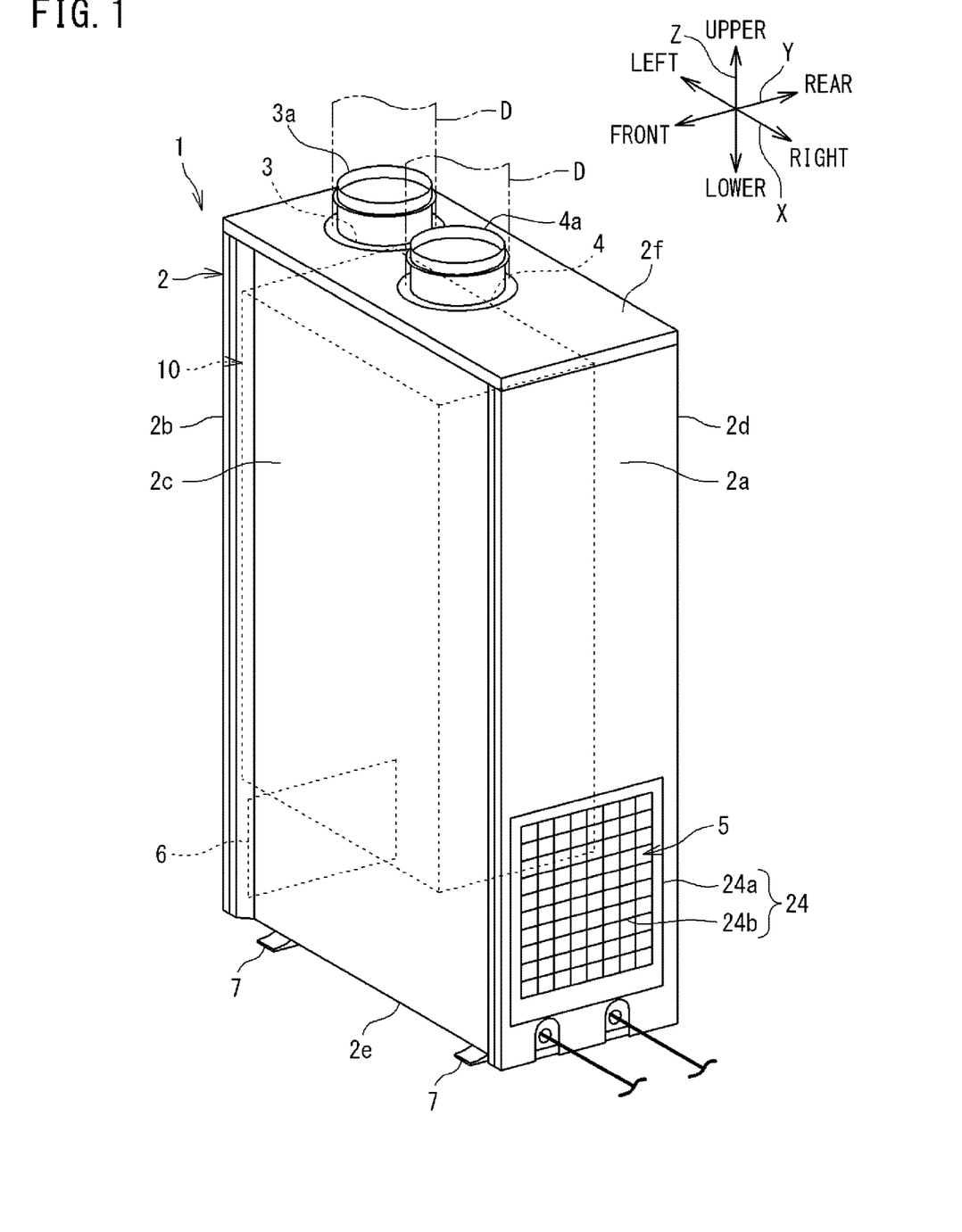
FIG. 1 is a perspective view of a ventilation device according to one or more embodiments of the present disclosure.

FIG. 1 is a perspective view of a ventilation device according to one or more embodiments of the present disclosure.

In the following description, the terms "upper", "lower", "front", "rear", "left", and "right" are indicated by arrows illustrated in FIGS. 1 to 3 in conjunction with these terms. Particularly in FIG. 1, a first direction indicated by an arrow X is defined as a left-and-right direction, a second direction indicated by an arrow Y is defined as a front-and-rear direction, and a third direction indicated by an arrow Z is defined as an up-and-down direction. However, these definitions are merely exemplary. For example, the first direction X may be regarded as the front-and-rear direction and the second direction Y may be regarded as the left-and-right direction.

The ventilation device 1 is configured to exchange air in a building (i.e., air in a room) with air outside the building (i.e., air outside the room), thereby providing ventilation of air in the building. The ventilation device 1 is installed outside the building. The ventilation device 1 is connected to the inside of the building with two ducts D. The ventilation device 1 includes a main casing (a first casing) 2 having a rectangular parallelepiped box shape. The ventilation device 1 according to one or more embodiments includes an auxiliary casing 13 (to be described later) in addition to the main casing 2.

The main casing 2 includes a bottom plate 2*e*, a top plate 2*f*, a right side plate 2*a*, a left side plate 2*b*, a front side plate 2*c*, and a rear side plate 2*d*. The bottom plate 2*e* and the top plate 2*f* each have a rectangular shape in plan view and are opposite to each other with a spacing in between in the up-and-down direction. The right side plate 2*a*, the left side plate 2*b*, the front side plate 2*c*, and the rear side plate 2*d* connect the four sides of the bottom plate 2*e* and the four sides of the top plate 2*f*, respectively.

The top plate 2*f* of the main casing 2 has a main return air intake port (a second return air intake port) 3 and a main air supply port (a second air supply port) 4. A tubular body 3*a* and a tubular body 4*a* are respectively mounted to the main return air intake port 3 and the main air supply port 4. The tubular bodies 3*a* and 4*a* are respectively connected to one ends of the ducts D. The other ends of the ducts D are connected to the inside of the building. That is, the main return air intake port 3 and the main air supply port 4 communicate with the inside of the building via the ducts D.

The bottom plate 2e of the main casing 2 is provided with a pair of legs 7. The ventilation device 1 is installed outside the building in such a manner that the ventilation device 1 is fastened using bolts or the like with the legs 7 mounted on the ground. The ventilation device 1 is not necessarily placed on the ground. For example, the ventilation device 1 may be placed on a pedestal mounted to, for example, an outer wall of the building or the roof of the building.

The right side plate 2a of the main casing 2 has a main outside air intake port (a second outside air intake port) 5. The left side plate 2b of the main casing 2 has a main exhaust port (a second exhaust port) 6.

The main casing 2 accommodates a ventilation device main body 10. The ventilation device main body 10 according to one or more embodiments is a known ventilation device designed to be installed in an attic or hung on a wall surface in a building. The ventilation device 1 according to the present disclosure is designed to be installed outdoors in such a manner that a ventilation device designed to be installed indoors is accommodated in the main casing 2. Ventilation devices designed to be installed indoors are not exposed to rain unlike ventilation devices designed to be installed outdoors; therefore, due consideration concerning waterproofness is not given to the ventilation devices designed to be installed indoors. In view of this, the ventilation device 1 according to the present disclosure is installable outdoors in such a manner that a ventilation device designed to be installed indoors is accommodated in the main casing 2 excellent in waterproofness. As a matter of course, the ventilation device 1 according to the present disclosure may employ a ventilation device designed to be installed only outdoors, rather than the ventilation device designed to be installed indoors.

Figure 2:
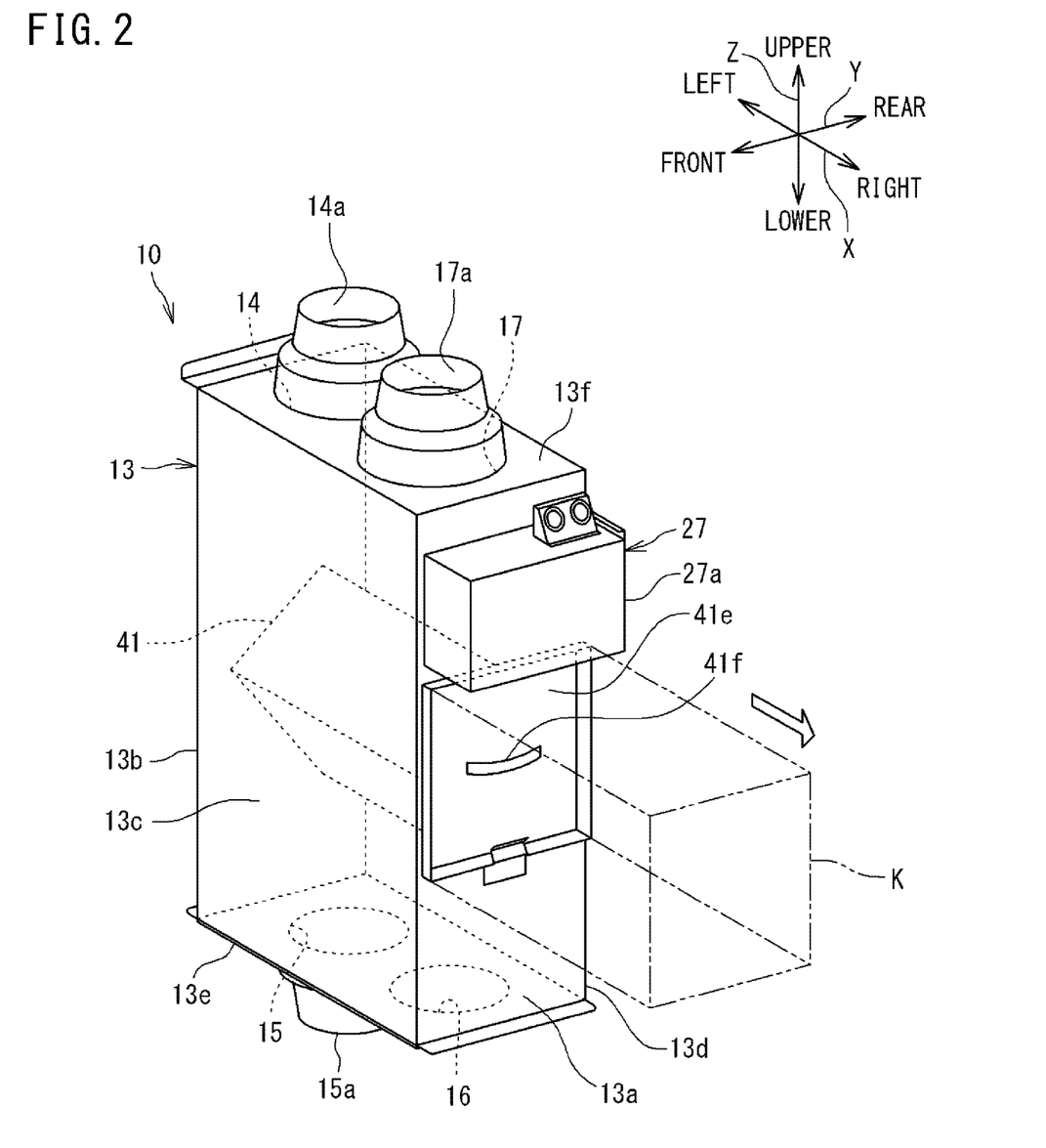
FIG. 2 is a perspective view of a ventilation device main body.

FIG. 2 is a perspective view of the ventilation device main body.

The ventilation device main body 10 includes an auxiliary casing (a second casing) 13 having a rectangular parallelepiped box shape. The auxiliary casing 13 substantially has an accommodation space S for accommodating an air supply fan 42, an exhaust fan 43, and a total heat exchanger 41, which will be described later (see FIG. 3). The auxiliary casing 13 includes a bottom plate 13e, a top plate 13f, a right side plate 13a, a left side plate 13b, a front side plate 13c, and a rear side plate 13d. The bottom plate 13e and the top plate 13f each have a rectangular shape in plan view and are opposite to each other with a spacing in between in the up-and-down direction. The right side plate 13a, the left side plate 13b, the front side plate 13c, and the rear side plate 13d connect the four sides of the bottom plate 13e and the four sides of the top plate 13f, respectively.

An electric component unit 27 is mounted to an upper portion of the right side plate 13a. The electric component unit 27 includes a box 27a and electric components, such as a control board and a terminal block, accommodated in the box 27a. The electric component unit 27 may alternatively be mounted to one of the other side plates 13b, 13c, and 13d.

The top plate 13f of the auxiliary casing 13 has an auxiliary return air intake port (a first return air intake port) 14 and an auxiliary air supply port (a first air supply port) 17. A tubular body 14a and a tubular body 17a are respectively mounted to the auxiliary return air intake port 14 and the auxiliary air supply port 17.

The bottom plate 13e of the auxiliary casing 13 serves as a partition defining a lower end of the accommodation space S for accommodating the air supply fan 42, the exhaust fan 43, and the total heat exchanger 41. The bottom plate 13e of the auxiliary casing 13 has an auxiliary outside air intake port (a first outside air intake port) 16 and an auxiliary exhaust port (a first exhaust port) 15. A tubular body 15a is mounted to the auxiliary exhaust port 15. However, the tubular body 15a is not necessarily mounted to the auxiliary exhaust port 15.

Figure 3:
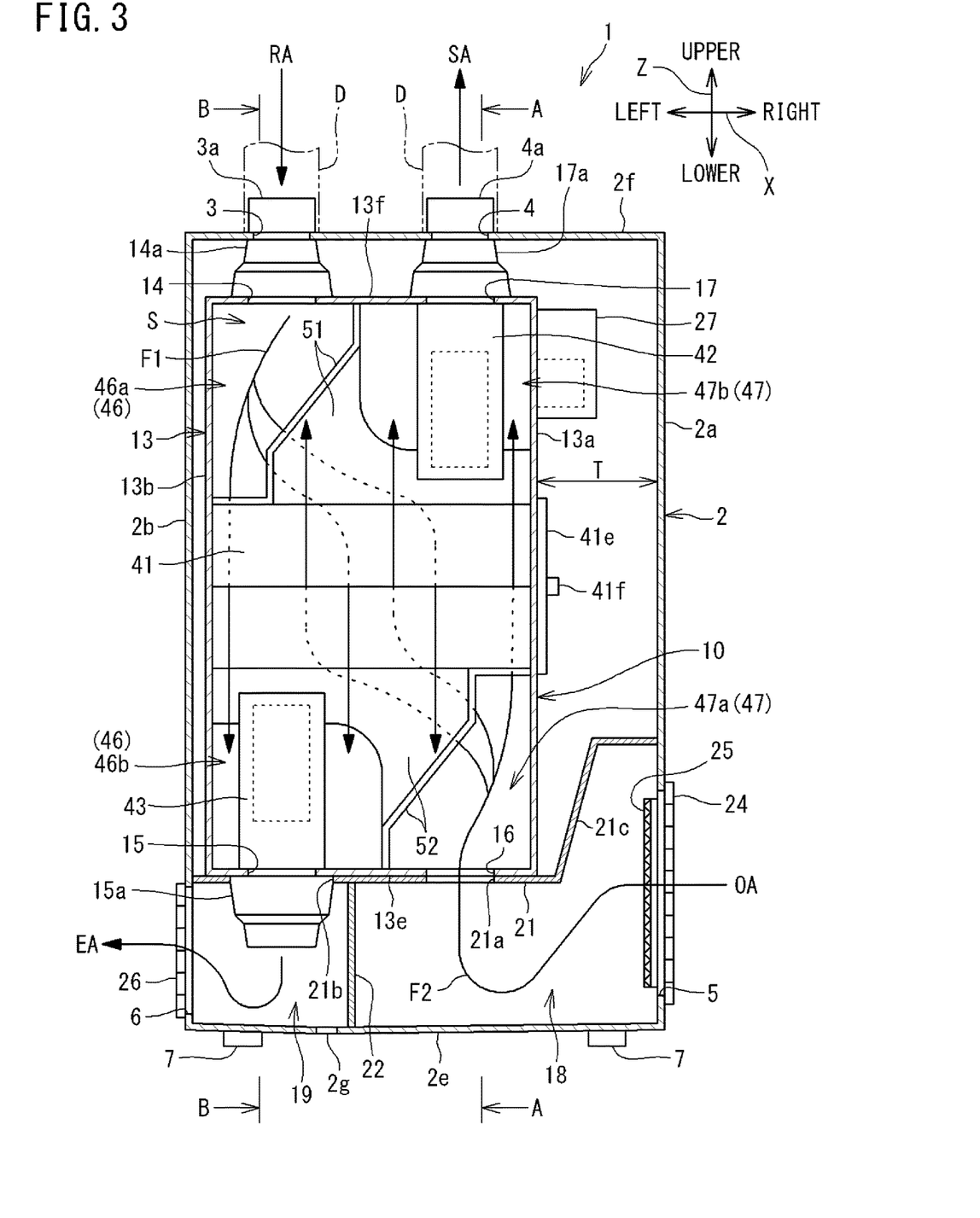
FIG. 3 is a front view schematically illustrating the inside of the ventilation device.
Figure 4:
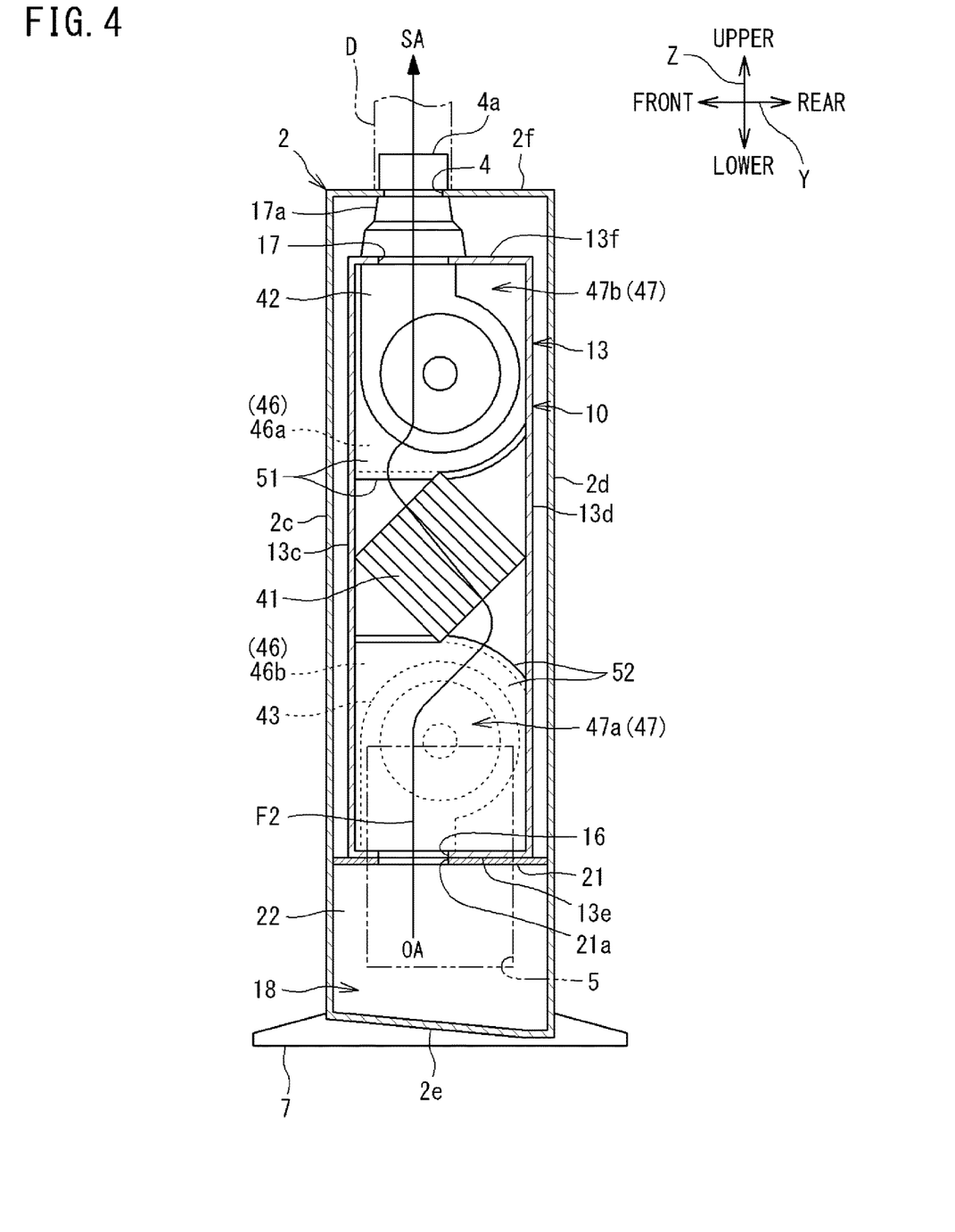
FIG. 4 is a sectional view taken along line A-A in FIG. 3.
Figure 5:
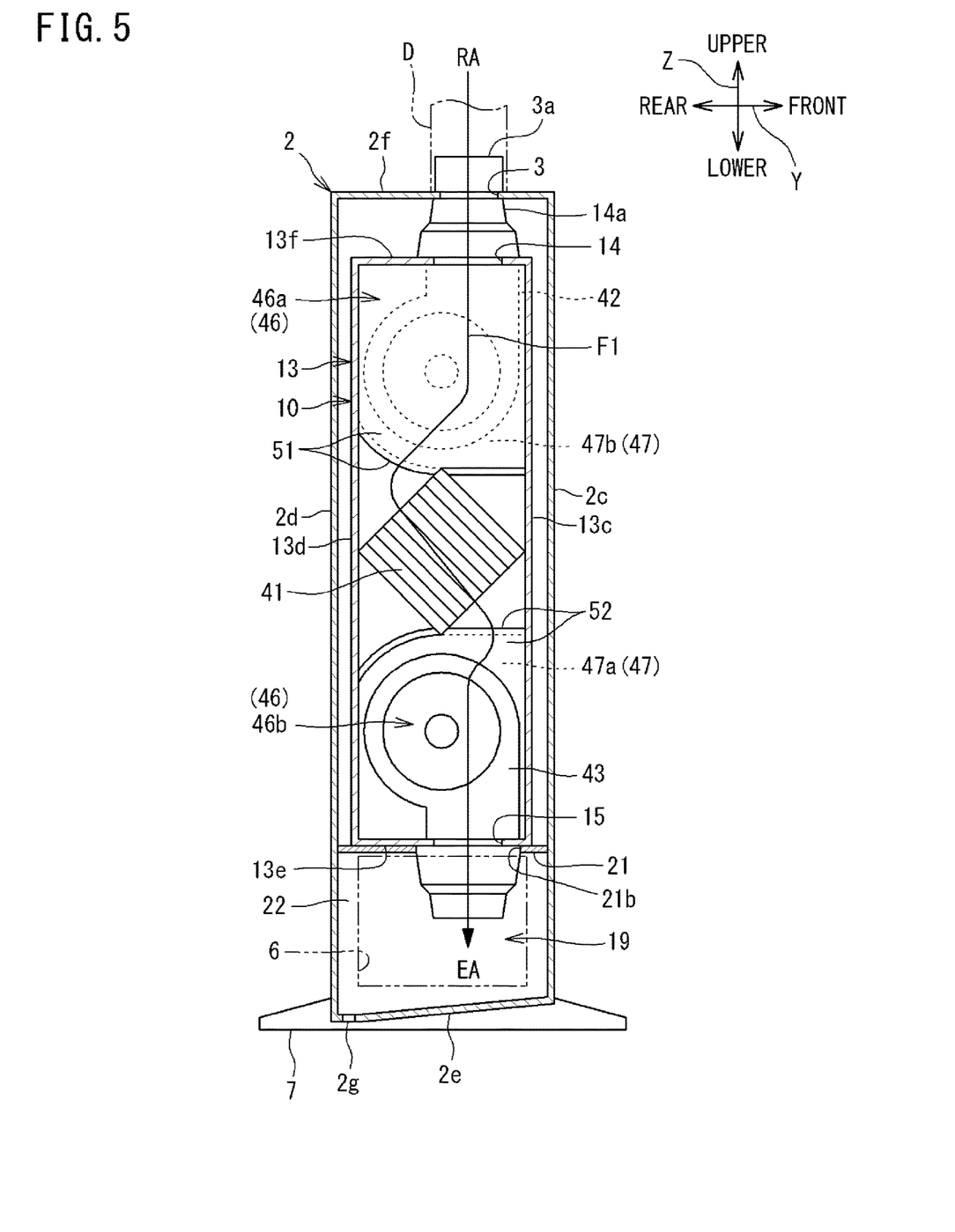
FIG. 5 is a sectional view taken along line B-B in FIG. 3.

FIG. 3 is a front view schematically illustrating the inside of the ventilation device. FIG. 4 is a sectional view taken along line A-A in FIG. 3. FIG. 5 is a sectional view taken along line B-B in FIG. 3.

The tubular bodies 14a and 17a mounted to the top plate 13f of the auxiliary casing 13 have distal ends respectively communicating with the main return air intake port 3 and main air supply port 4 in the main casing 2. Since the electric component unit 27 is mounted to the right side plate 13a of the auxiliary casing 13, a spacing T between the right side plate 13a and the right side plate 2a of the main casing 2 is wider than spacings between the other side plates of the auxiliary casing 13 and the corresponding side plates of the main casing 2. This spacing T may alternatively be secured between one of the other side plates of the auxiliary casing 13 and the corresponding one of the other side plates of the main casing 2.

A waterproof panel 21 is mounted to a lower surface of the bottom plate 13e of the auxiliary casing 13. The waterproof panel 21 is formed of, for example, a metal plate member covered with a waterproof coating or subjected to surface treatment for waterproofness, to impart waterproofness to the lower surface of the bottom plate 13e. The waterproof panel 21 covers the entire lower surface of the bottom plate 13e. The waterproof panel 21 has an opening 21a communicating with the auxiliary outside air intake port 16 and an opening 21b communicating with the auxiliary exhaust port 15. The waterproof panel 21 includes an extended portion 21c extending from the bottom plate 13e to the right side plate 2a of the main casing 2. The extended portion 21c is located in the spacing T. The extended portion 21c extends upward beyond the bottom plate 13e and reaches the right side plate 2a at a position higher than the bottom plate 13e.

The waterproof panel 21 has a length in the front-and-rear direction substantially equal to a distance between the front side plate 2c and the rear side plate 2d of the main casing 2 in the front-and-rear direction. The waterproof panel 21 has a length in the left-and-right direction substantially equal to a distance between the right side plate 2a and the left side plate 2b of the main casing 2 in the left-and-right direction. The waterproof panel 21 separates the space defined by the right side plate 2a, the left side plate 2b, the front side plate 2c, and the rear side plate 2d into two in the up-and-down direction, and suppresses intrusion of water from the space below the waterproof panel 21 into the space above the waterproof panel 21. The waterproof panel 21 may be constituted of a single member or may be constituted of a combination of multiple members.

The main casing 2 has an outside air intake chamber 18 and an exhaust chamber 19 each defined between the bottom plate (the partition) 13e of the auxiliary casing 13 and the bottom plate 2e of the main casing 2. The outside air intake chamber 18 communicates with the main outside air intake port 5 and the auxiliary outside air intake port 16. The exhaust chamber 19 communicates with the main exhaust port 6 and the auxiliary exhaust port 15. The waterproof panel 21 defines an upper end of the outside air intake chamber 18. Therefore, the waterproof panel 21 also serves as a partition in this respect.

The outside air intake chamber 18 and the exhaust chamber 19 are defined by a divider 22 in the left-and-right direction. The divider 22 is placed with a slight clearance between the divider 22 and bottom plate 2e of the main casing 2. This clearance permits flow of water on the bottom plate 2e from the outside air intake chamber 18 to the exhaust chamber 19 and vice versa.

The main return air intake port 3 in the main casing 2 is used for taking air in the building (i.e., return air RA from the building) in the main casing 2. The auxiliary return air intake port 14 in the auxiliary casing 13 is used for taking the return air RA from the building in the auxiliary casing 13. The main exhaust port 6, exhaust chamber 19, and auxiliary exhaust port 15 are used for discharging the return air RA in the main casing 2 and auxiliary casing 13 outdoors as exhaust air EA. The main outside air intake port 5, outside air intake chamber 18, and auxiliary outside air intake port 16 are used for taking air outside the building (i.e., outside air OA) in the main casing 2 and auxiliary casing 13. The main air supply port 4 and auxiliary air supply port 17 are used for supplying the outside air OA in the main casing 2 and auxiliary casing 13, indoors as supply air SA.

The main outside air intake port 5 extends upward beyond the partition 13e, from a range below the partition 13e in the right side plate 2a. The waterproof panel 21 extends from the lower surface of the partition 13e to a position above an upper end of the main outside air intake port 5. On the other hand, the main exhaust port 6 is defined in a range below the partition 13e in the left side plate 2b. Therefore, the main exhaust port 6 is smaller in area than the main outside air intake port 5. It should be noted that the main exhaust port 6 may extend upward beyond the partition 13e, from the range below the partition 13e, as in the main outside air intake port 5. Conversely, the main outside air intake port 5 may be defined only in the range below the partition 13e. As illustrated in FIGS. 1 and 3, the main outside air intake port 5 is covered with a protective net 24, and the main exhaust port 6 may be covered with a protective net 26. The main outside air intake port 5 is further covered with a filter 25.

The bottom plate 2e of the main casing 2 has a drain port 2g. The drain port 2g is located in the exhaust chamber 19. The bottom plate 2e is tilted such that the drain port 2g becomes lowest in position. As a result, water on the bottom plate 2e flows toward the drain port 2g and then flows out of the main casing 2 through the drain port 2g.

The total heat exchanger 41, the air supply fan 42, and the exhaust fan 43 are placed in the auxiliary casing 13. In the main casing 2 and auxiliary casing 13, return air RA taken in the main casing 2 and auxiliary casing 13 through the main return air intake port 3 and auxiliary return air intake port 14 flows through the total heat exchanger 41 and then flows out of the auxiliary casing 13 through the auxiliary exhaust port 15, exhaust chamber 19, and main exhaust port 6, as exhaust air EA. Hereinafter, this flow of air is also referred to as "a first air flow F1". Outside air OA taken in the main casing 2 and auxiliary casing 13 through the main outside air intake port 5, outside air intake chamber 18, and auxiliary outside air intake port 16 flows through the total heat exchanger 41 and then flows into the building through the auxiliary air supply port 17 and main air supply port 4, as supply air SA. Hereinafter, this flow of air is also referred to as "a second air flow F2".

Figure 7:
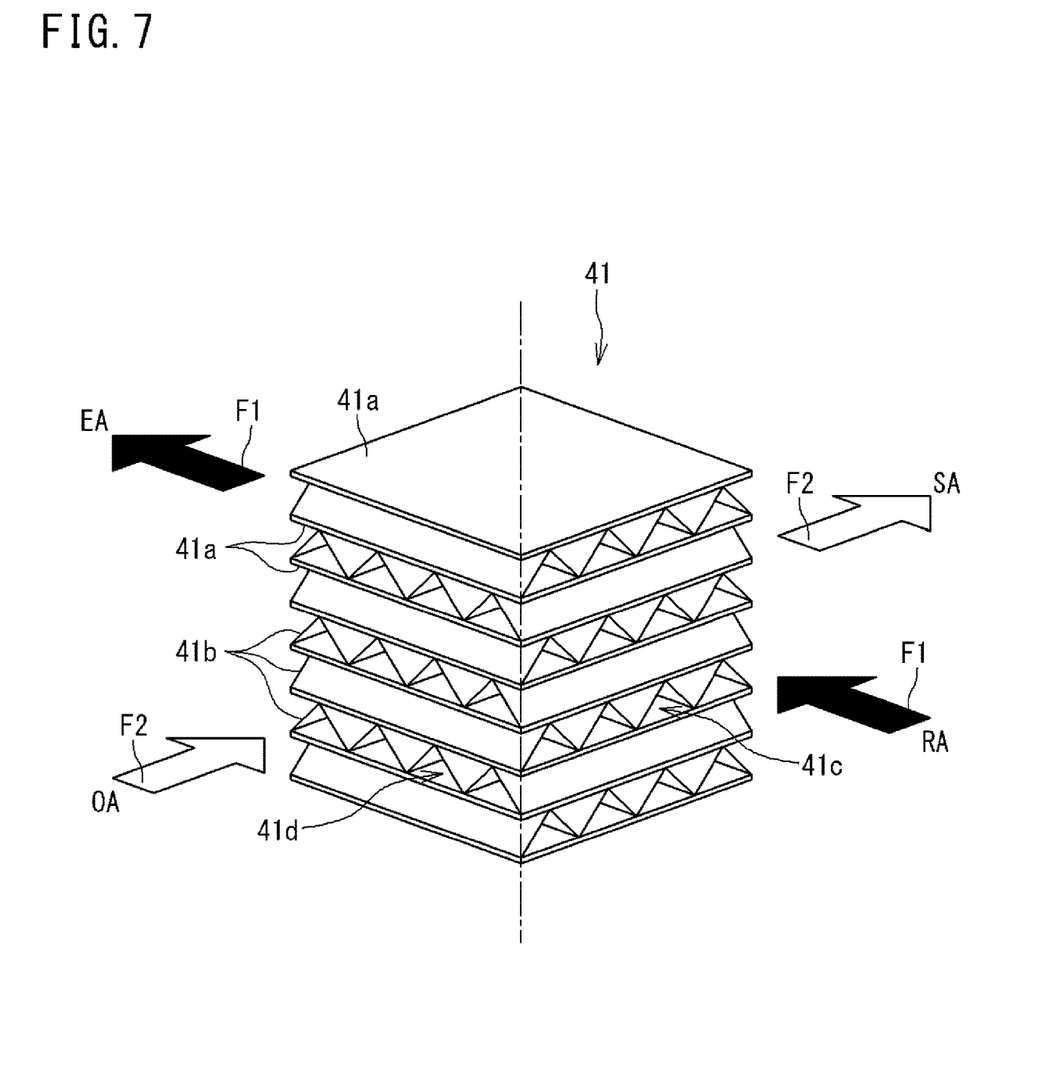
FIG. 7 is a perspective view of a total heat exchanger.

FIG. 7 is a perspective view of the total heat exchanger.

The total heat exchanger 41 according to one or more embodiments is an orthogonal total heat exchanger through which the first air flow F1 and the second air flow F2 pass substantially orthogonally. The total heat exchanger 41 includes dividers 41a and spacing plates 41b. The dividers 41a and the spacing plates 41b are stacked alternately and bonded together with an appropriate adhesive. The total heat exchanger 41 has a substantially quadrangular prism shape as a whole.

The dividers 41a each possess heat conductivity and moisture permeability and have a flat plate shape. The dividers 41a each possess a property that allows transmission of a refrigerant.

The spacing plates 41b each have a corrugated shape made up of consecutive substantially triangular sections. Each spacing plate 41b forms an air passage between adjacent two of the dividers 41a. The spacing plates 41b are stacked with their angles changed 90 degrees one by one in the direction along which the dividers 41a and spacing plates 41b are stacked. As a result, an exhaust air-side passage 41c through which the first air flow F1 passes and a supply air-side passage 41d through which the second air flow F2 passes are defined orthogonally with one divider 41a sandwiched therebetween. Each divider 41a possessing heat conductivity and moisture permeability performs exchange between sensible heat and latent heat (i.e., total heat exchange) on air flowing through the exhaust air-side passage 41c and air flowing through the supply air-side passage 41d.

As illustrated in FIGS. 3 to 5, the total heat exchanger 41 divides the inside of the auxiliary casing 13 into an indoor-side region (an upper side in the auxiliary casing 13) and an outdoor-side region (a lower side in the auxiliary casing 13). As illustrated in FIGS. 3 and 5, in the auxiliary casing 13, an upstream-side exhaust air path 46a is formed upstream of the total heat exchanger 41 in the first air flow F1, and a downstream-side exhaust air path 46b is formed downstream of the total heat exchanger 41 in the first air flow F1. The upstream-side exhaust air path 46a and the downstream-side exhaust air path 46b form an exhaust air path 46 that causes the inside of the building and the outside of the building to communicate with each other via the total heat exchanger 41.

As illustrated in FIGS. 3 and 4, in the auxiliary casing 13, an upstream-side supply air path 47a is formed upstream of the total heat exchanger 41 in the second air flow F2, and a downstream-side supply air path 47b is formed downstream of the total heat exchanger 41 in the second air flow F2. The upstream-side supply air path 47a and the downstream-side supply air path 47b form a supply air path 47 that causes the inside of the building and the outside of the building to communicate with each other via the total heat exchanger 41.

As illustrated in FIG. 3, a partition wall 51 is disposed between the upstream-side exhaust air path 46a and the downstream-side supply air path 47b. A partition wall 52 is disposed between the downstream-side exhaust air path 46b and the upstream-side supply air path 47a.

As illustrated in FIGS. 3 and 5, the exhaust fan 43 is placed near the auxiliary exhaust port 15 on the downstream-side exhaust air path 46b. The exhaust fan 43, when being driven, generates the first air flow F1, so that return air RA from the building flows through the exhaust air path 46 and then flows outdoors as exhaust air EA.

As illustrated in FIGS. 3 and 4, the air supply fan 42 is placed near the auxiliary air supply port 17 on the downstream-side supply air path 47b. The air supply fan 42, when being driven, generates the second air flow F2, so that outside air OA outside the building flows through the supply air path 47 and then flows indoors as supply air SA.

A ventilating operation is carried out when the exhaust fan 43 and the air supply fan 42 are driven. Ventilation of air in the building is thus provided in such a manner that return air RA from the building is discharged from the building while outside air OA outside the building is supplied into the building. In addition, variations in temperature and humidity in the building are suppressed in such a manner that the total heat exchanger 41 performs exchange between sensible heat and latent heat on the return air RA from the building and the outside air OA outside the building.

As illustrated in FIG. 2, the total heat exchanger 41 is extractable sideward (i.e., in a direction indicated by a white arrow) from the auxiliary casing 13. The total heat exchanger 41 according to one or more embodiments includes a portion 41e protruding from the right side plate 13a, and this portion 41e is provided with a handle 41f. A worker grips the handle 41f and pulls the total heat exchanger 41 in the direction indicated by the white arrow, thereby extracting the total heat exchanger 41 from the auxiliary casing 13. In FIG. 2, reference sign K denotes a projection region of the total heat exchanger 41 extracted sideward, that is, a spatial region where the total heat exchanger 41 passes when the total heat exchanger 41 is extracted from the auxiliary casing 13.

Figure 8:
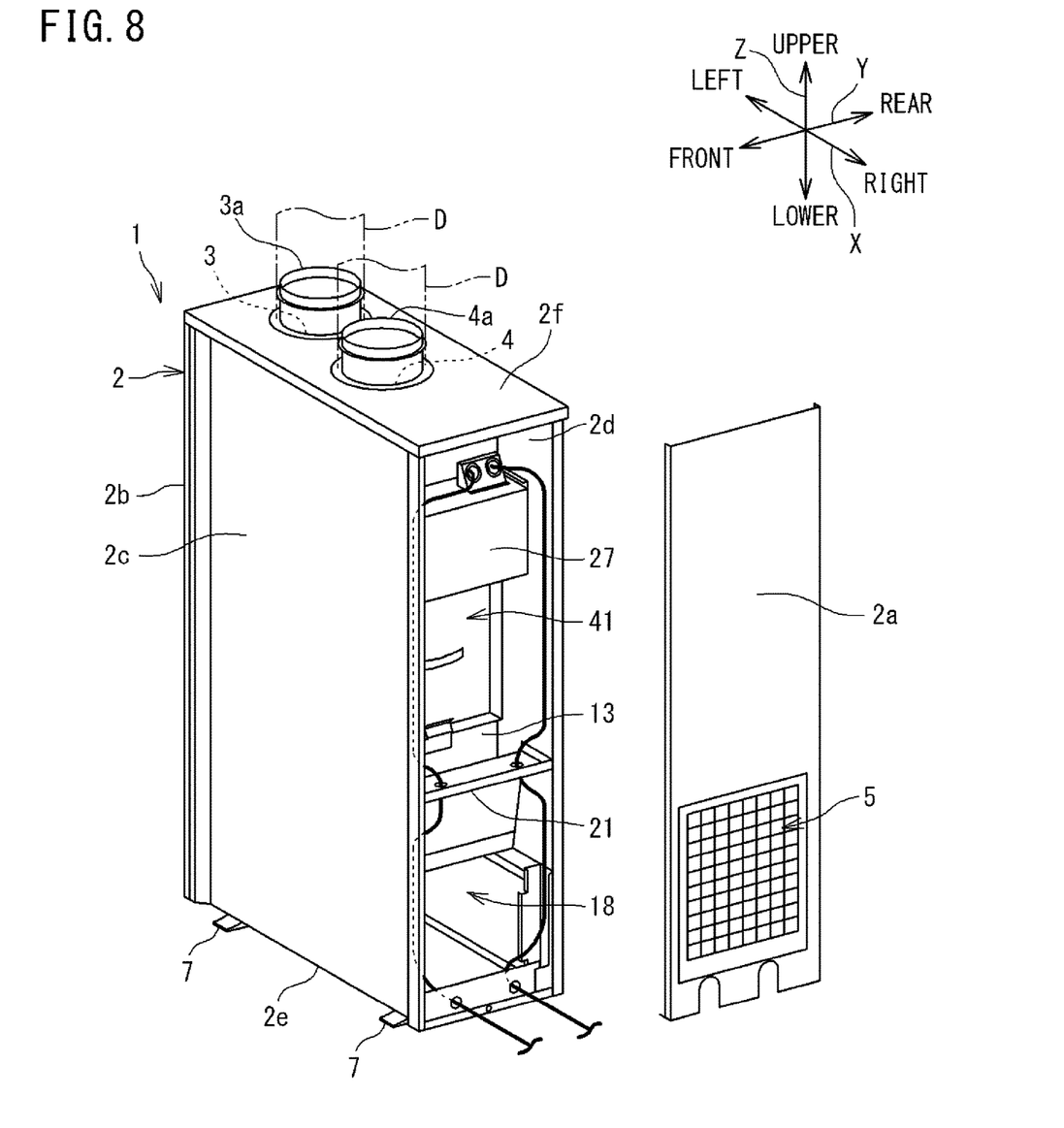
FIG. 8 is a perspective view illustrating the ventilation device from which a side plate is detached.

FIG. 8 is a perspective view illustrating the ventilation device from which a side plate is detached.

In the ventilation device 1 according to one or more embodiments, as illustrated in FIG. 8, the right side surface of the main casing 2 is opened when the right side plate 2a is detached from the main casing 2. Therefore, the total heat exchanger 41 can be extracted sideward from the auxiliary casing 13 and main casing 2 through this opening. Since the total heat exchanger 41 is extractable from the auxiliary casing 13 and the main casing 2, the total heat exchanger 41 can be maintained or replaced with a new one with ease. When the right side plate 2a of the main casing 2 is detached, the electric component unit 27 is exposed to the outside. Therefore, the electric component unit 27 can be operated or maintained with ease.

Figure 6A:
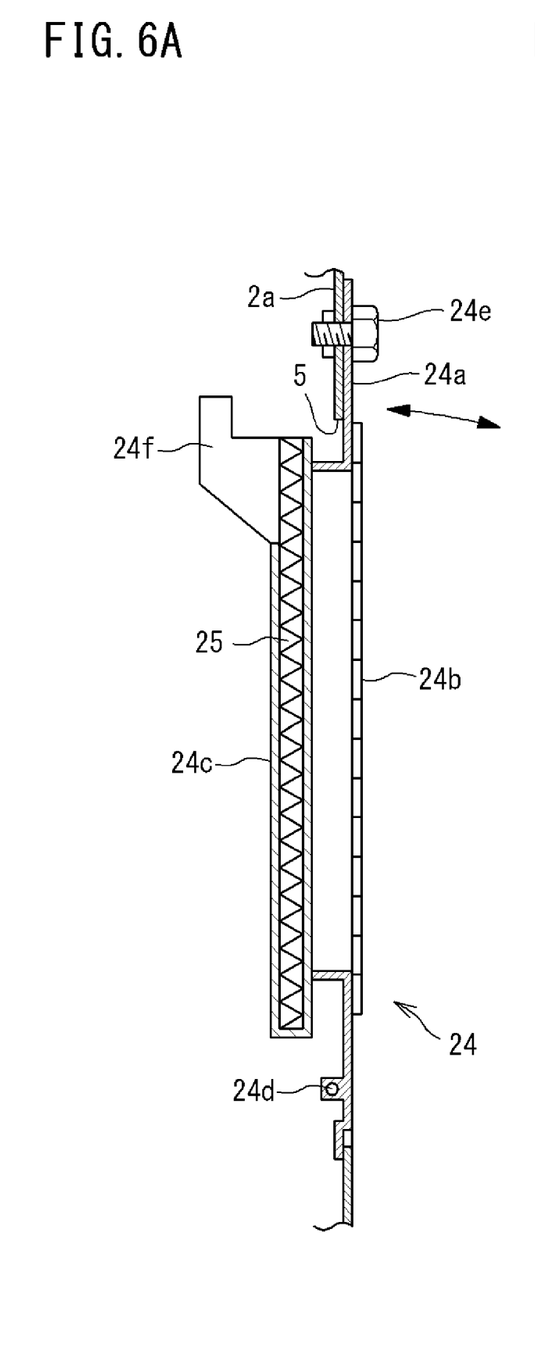
FIGS. 6A and 6B are sectional views of a main outside air intake port and its surroundings.
Figure 6B:
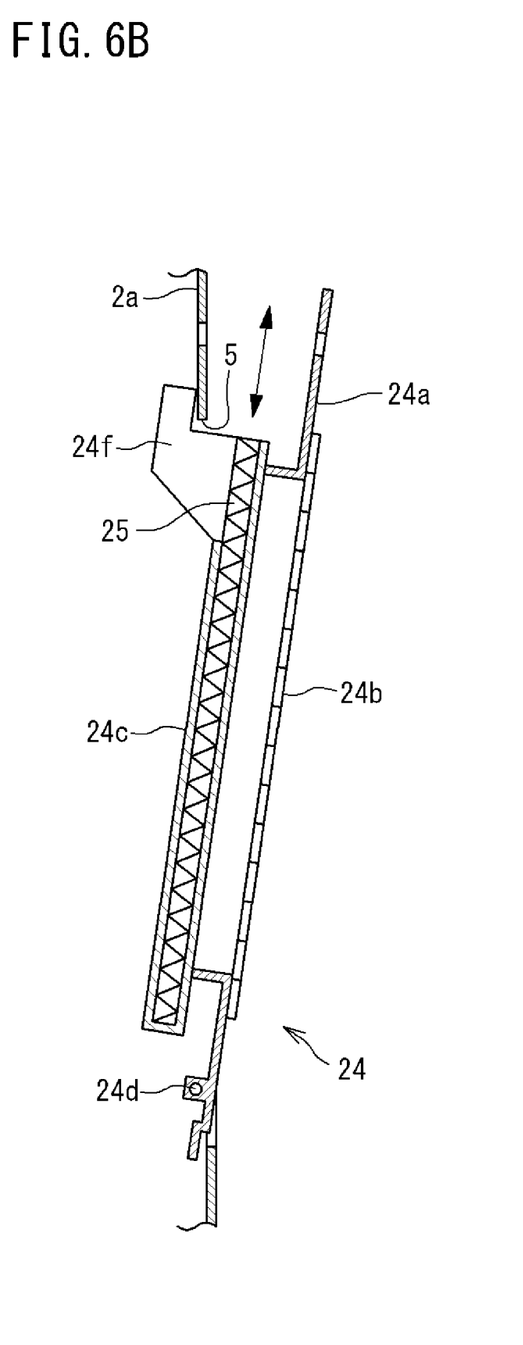

FIGS. 6A and 6B are sectional views of the main outside air intake port and its surroundings.

As illustrated in FIGS. 1 and 6A, the main outside air intake port 5 is covered with the protective net 24. The protective net 24 includes a frame member 24a having a quadrilateral shape and a net member 24b attached to the frame member 24a. The protective net 24 is provided with the filter 25. The frame member 24a of the protective net 24 has guide grooves 24c into which front and rear end edges of the filter 25 can be inserted in the up-and-down direction.

The frame member 24a has a lower end mounted to the main casing 2 so as to be swingable on a pivot 24d in the left-and-right direction. The frame member 24a has an upper end fixed to the right side plate 2a with a fixing member 24e. As illustrated in FIG. 6B, the fixing of the frame member 24a with the fixing member 24e is released, and the frame member 24a is swung rightward, so that upper ends of the guide grooves 24c are exposed to the outside of the main casing 2. The swinging motion of the frame member 24a is restricted with a stopper 24f of the frame member 24a abutting against the right side plate 2a. The filter 25 can be attached to and detached from the guide grooves 24c in this state.

OTHER EMBODIMENTS

The ventilation device 1 may include, instead of the total heat exchanger 41, another heat exchanger such as a heat exchanger through which a heat exchange medium (e.g., a refrigerant) flows.

The ventilation device 1 does not necessarily include a heat exchanger. For example, the ventilation device 1 may include a filter rather than a heat exchanger.

The main outside air intake port 5 may be bored in one of the left side plate 2b, front side plate 2c, and rear side plate 2d of the main casing 2. The main exhaust port 6 may be bored in one of the right side plate 2a, front side plate 2c, and rear side plate 2d of the main casing 2. The positional relationship between the main outside air intake port 5 and the main exhaust port 6 is not limited unless outside air and exhaust air are mixed together.

The ventilation device 1 does not necessarily include the auxiliary casing 13. For example, the accommodation space S, the outside air intake chamber 18, the exhaust chamber 19, and the like may be defined in such a manner that the inside of the main casing 2 is divided by a partition.

Action and Effects of Embodiments

In the ventilation device disclosed in Patent Literature 1, the exhaust air port is bored in the front surface of the casing and is located at the lower stage portion in the casing. The exhaust air port is therefore located near the ground. Consequently, rainwater and the like possibly intrude into the casing through the exhaust air port. At the lower stage portion in the casing, the exhaust fan, an electric wire connected to the exhaust fan, and the like are possibly affected by water intruding into the casing. Therefore, one or more embodiments of the present disclosure suppress intrusion of water into a space where a fan is accommodated, in a ventilation device to be installed outdoors.

Action and Effects (1) The ventilation device 1 according to the foregoing embodiments is designed to be installed outdoors. The ventilation device 1 includes the air supply fan 42, the exhaust fan 43, and the casing (including the main casing 2 and the auxiliary casing 13) having the accommodation space S in which the air supply fan 42 and the exhaust fan 43 are accommodated. The casing 13 includes the partition 13e defining the lower end of the accommodation space S. The partition 13e has the auxiliary outside air intake port 16 and the auxiliary exhaust port 15 each passing through the partition 13e in the up-and-down direction. The casing 2 includes the bottom plate 2e and has the outside air intake chamber 18 defined between the bottom plate 2e and the partition 13e located above the bottom plate 2e, the outside air intake chamber 18 communicating with the auxiliary outside air intake port 16, and the exhaust chamber 19 defined between the bottom plate 2e and the partition 13e located above the bottom plate 2e, the exhaust chamber 19 communicating with the auxiliary exhaust port 15. The casing 2 includes the side plates 2a, 2b, 2c, 2d respectively having the main outside air intake port 5 through which the outside air intake chamber 18 communicates with the outside of the casing 2 and the main exhaust port 6 through which the exhaust chamber 19 communicates with the outside of the casing 2.

In the ventilation device 1 designed to be installed outdoors and configured as described above, the outside air intake chamber 18 and the exhaust chamber 19 are defined between the bottom plate 2e of the casing 2 and the partition 13e above the bottom plate 2e. Therefore, even when water intrudes into the casing 2 through the main outside air intake port 5 and main exhaust port 6 each bored in the casing 2, the water can be retained in the outside air intake chamber 18 and exhaust chamber 19. The ventilation device 1 is thus capable of suppressing intrusion of the water into the accommodation space S above the partition 13e. The ventilation device 1 is therefore capable of suppressing adverse influence to be exerted on electric components (e.g., the air supply fan 42, the exhaust fan 43) and electric wires in the accommodation space S.

(2) In the foregoing embodiments, the bottom plate 2e of the casing 2 has the drain port 2g located in the exhaust chamber 19. During use of the ventilation device 1 in the wintertime, relatively warm air in the building flows into the exhaust chamber 19 through the auxiliary exhaust port 15. The ventilation device 1 is therefore capable of suppressing freezing of water intruding into the exhaust chamber 19 to suppress clogging of the drain port 2g with ice.

(3) In the foregoing embodiments, the bottom plate 2e of the casing 2 is tilted such that the drain port 2g is lower in position. According to this configuration, water, when intruding into the outside air intake chamber 18 and exhaust chamber 19, flows toward the drain port 2g in the exhaust chamber 19. The ventilation device 1 is therefore capable of draining the water through the drain port 2g without a disadvantageous situation in which the water is frozen.

(4) In the foregoing embodiments, the partition 13e has the lower surface to which waterproofness is imparted. Therefore, the partition 13e is less susceptible to deterioration (e.g., rusting) owing to water intruding into the outside air intake chamber 18 and exhaust chamber 19.

(5) In the foregoing embodiments, the ventilation device 1 further includes the waterproof panel 21 having waterproofness, the waterproof panel 21 disposed on the lower surface of the partition 13e. Therefore, waterproofness can be imparted to the lower surface of the partition 13e with ease. Particularly in the ventilation device according to the foregoing embodiments, a ventilation device designed to be installed indoors is used as the ventilation device main body 10. As a result, the auxiliary casing 13 does not possess such waterproofness as to withstand outdoor installation. In view of this, the waterproof panel 21 is mounted to the lower surface of the bottom plate 13e (serving as the partition 13e) of the auxiliary casing 13, so that waterproofness can be imparted to the bottom plate 13e with ease.

(6) In the foregoing embodiments, the main outside air intake port 5 or the main exhaust port 6 extends upward beyond the partition 13e, from the range below the partition 13e in the corresponding one of the side plates 2a, 2b, 2c, 2d. The ventilation device 1 is therefore capable of increasing an amount of supply air through the main outside air intake port 5 extended in the up-and-down direction or an amount of exhaust air through the main exhaust port 6 extended in the up-and-down direction.

(7) In the foregoing embodiments, the casing 2 includes the first side plate 2a, 2b, 2c, 2d having the main outside air intake port 5 or the main exhaust port 6, the first side plate 2a, 2b, 2c, 2d spaced horizontally away from the partition 13e (the right side plate 2a having the main outside air intake port 5 in the example illustrated in FIG. 3). The main outside air intake port 5 or main exhaust port 6 in the first side plate 2a, 2b, 2c, 2d extends upward beyond the partition 13e, from the range below the partition 13e in the first side plate 2a, 2b, 2c, 2d. The waterproof panel 21 extends from the lower surface of the partition 13e to the position above the main outside air intake port 5 in the first side plate 2a, 2b, 2c, 2d. Therefore, the outside air intake chamber 18 can be defined between the partition 13e and the first side plate 2a, 2b, 2c, 2d, with the waterproof panel 21. The waterproof panel 21 is capable of suppressing adhesion, to the auxiliary casing 13, water intruding into the outside air intake chamber 18 through the outside air intake port 5.

(8) In the foregoing embodiments, the casing 2, 13 includes the auxiliary casing 13 in which the air supply fan 42 and the exhaust fan 43 are accommodated, and the main casing 2 in which the auxiliary casing 13 is accommodated. The partition 13e serves as the bottom plate of the auxiliary casing 13. The outside air intake chamber 18 and the exhaust chamber 19 are defined between the bottom plate 13e of the auxiliary casing 13 and the bottom plate 2e of the main casing 2. Therefore, in a case where a known ventilation device designed to be installed indoors is used as the ventilation device main body 10, the outside air intake chamber 18 and the exhaust chamber 19 can be defined in the main casing 2.

Although the disclosure has been described with respect to only a limited number of embodiments, those skilled in the art, having benefit of this disclosure, will appreciate that various other embodiments may be devised without departing from the scope of the present disclosure. Accordingly, the scope of the disclosure should be limited only by the attached claims.

REFERENCE SIGNS LIST 1 ventilation device
2 main casing (first casing)
2a right side plate
2b left side plate
2c front side plate
2d rear side plate
2e bottom plate
2g drain port
5 main outside air intake port (second outside air intake port)
6 main exhaust port (second exhaust port)
13 auxiliary casing (second casing)
13e bottom plate (partition)
15 auxiliary exhaust port (first exhaust port)
16 auxiliary outside air intake port (first outside air intake port)
18 outside air intake chamber
19 exhaust chamber
21 waterproof panel
42 air supply fan
43 exhaust fan
S accommodation space

What is claimed is:
1. A ventilation device to be installed outdoors, the ventilation device comprising:
an air supply fan;
an exhaust fan;
a heat exchanger; and
a casing having an accommodation space that accommodates the air supply fan, the exhaust fan, and the heat exchanger, wherein
the casing comprises:
a partition defining a lower end of the accommodation space and comprising a first outside air intake port and a first exhaust port each passing through the partition in an up-and-down direction;
a bottom plate;
an outside air intake chamber defined between the bottom plate and the partition disposed above the bottom plate and that communicates with the first outside air intake port;

an exhaust chamber defined between the bottom plate and the partition and that communicates with the first exhaust port;
side plates;
a second outside air intake port through which the outside air intake chamber communicates with an outside of the casing; and
a second exhaust port through which the exhaust chamber communicates with the outside of the casing,
the second outside air intake port and the second exhaust port are disposed in either a same one of the side plates or different ones of the side plates, and
all of electric components are disposed above the partition.

2. The ventilation device according to claim 1, wherein the casing further comprises:
a second casing that accommodates the air supply fan and the exhaust fan; and
a first casing that accommodates the second casing,
the partition serves as a bottom plate of the second casing, and
the outside air intake chamber and the exhaust chamber are defined between the bottom plate of the second casing and a bottom plate of the first casing.

3. The ventilation device according to claim 1, wherein the bottom plate of the casing comprises a drain port disposed in the exhaust chamber.

4. The ventilation device according to claim 2, wherein the bottom plate of the casing comprises a drain port disposed in the exhaust chamber.

5. The ventilation device according to claim 3, wherein the bottom plate of the casing is tilted such that the drain port is lower in position.

6. The ventilation device according to claim 4, wherein the bottom plate of the casing is tilted such that the drain port is lower in position.

7. The ventilation device according to claim 1, wherein the partition has a lower surface to which waterproofness is imparted.

8. The ventilation device according to claim 2, wherein the partition has a lower surface to which waterproofness is imparted.

9. The ventilation device according to claim 7, further comprising a waterproof panel having waterproofness on the lower surface of the partition.

10. The ventilation device according to claim 8, further comprising a waterproof panel having waterproofness on the lower surface of the partition.

11. A ventilation device to be installed outdoors, the ventilation device comprising:
an air supply fan;
an exhaust fan; and
a casing having an accommodation space that accommodates the air supply fan and the exhaust fan, wherein the casing comprises:
a partition defining a lower end of the accommodation space and comprising a first outside air intake port and a first exhaust port each passing through the partition in an up-and-down direction;
a bottom plate;
an outside air intake chamber defined between the bottom plate and the partition disposed above the bottom plate and that communicates with the first outside air intake port;
an exhaust chamber defined between the bottom plate and the partition and that communicates with the first exhaust port;
side plates;
a second outside air intake port disposed in one of the side plates and through which the outside air intake chamber communicates with an outside of the casing; and
a second exhaust port disposed in one of the side plates and through which the exhaust chamber communicates with the outside of the casing,
either one of the second outside air intake port or the second exhaust port extends upward beyond the partition from a range below the partition in a corresponding one of the side plates, and
all of electric components are disposed above the partition.

12. The ventilation device according to claim 11, wherein the bottom plate of the casing comprises a drain port disposed in the exhaust chamber.

13. The ventilation device according to claim 12, wherein the bottom plate of the casing is tilted such that the drain port is lower in position.

14. The ventilation device according to claim 11, wherein the partition has a lower surface to which waterproofness is imparted.

15. The ventilation device according to claim 14, further comprising a waterproof panel having waterproofness on the lower surface of the partition.

16. A ventilation device to be installed outdoors, the ventilation device comprising:
an air supply fan;
an exhaust fan; and
a casing having an accommodation space that accommodates the air supply fan and the exhaust fan, wherein the casing comprises:
a partition defining a lower end of the accommodation space and comprising a first outside air intake port and a first exhaust port each passing through the partition in an up-and-down direction;
a bottom plate;
an outside air intake chamber defined between the bottom plate and the partition disposed above the bottom plate and that communicates with the first outside air intake port;
an exhaust chamber defined between the bottom plate and the partition and that communicates with the first exhaust port;
side plates;
a second outside air intake port disposed in one of the side plates and through which the outside air intake chamber communicates with an outside of the casing; and
a second exhaust port disposed in one of the side plates and through which the exhaust chamber communicates with the outside of the casing,
the ventilation device further comprises a waterproof panel having waterproofness on a lower surface of the partition,
the one of the side plates with the second outside air intake port or the second exhaust port is spaced horizontally away from the partition,
the second outside air intake port or the second exhaust port in the one of the side plates extends upward beyond the partition from a range below the partition, and
the waterproof panel extends from the lower surface of the partition to a position above the second outside air intake port or the second exhaust port in the one of the side plates.

17. The ventilation device according to claim 16, wherein the bottom plate of the casing comprises a drain port disposed in the exhaust chamber.

18. The ventilation device according to claim 17, wherein the bottom plate of the casing is tilted such that the drain port is lower in position.

* * * * *